May 12, 1964
G. MERCURIALI
3,132,847
APPARATUS FOR DISTRIBUTING FRUIT OR NUTS
AND THE LIKE INTO A FLOWABLE PRODUCT
Filed March 29, 1962
2 Sheets-Sheet 1
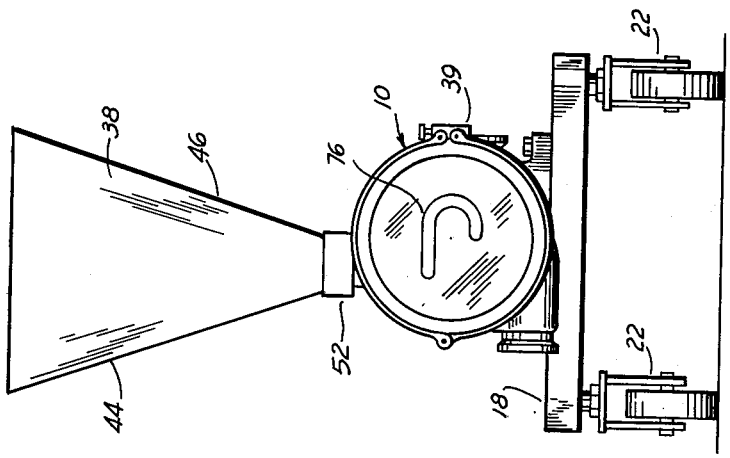
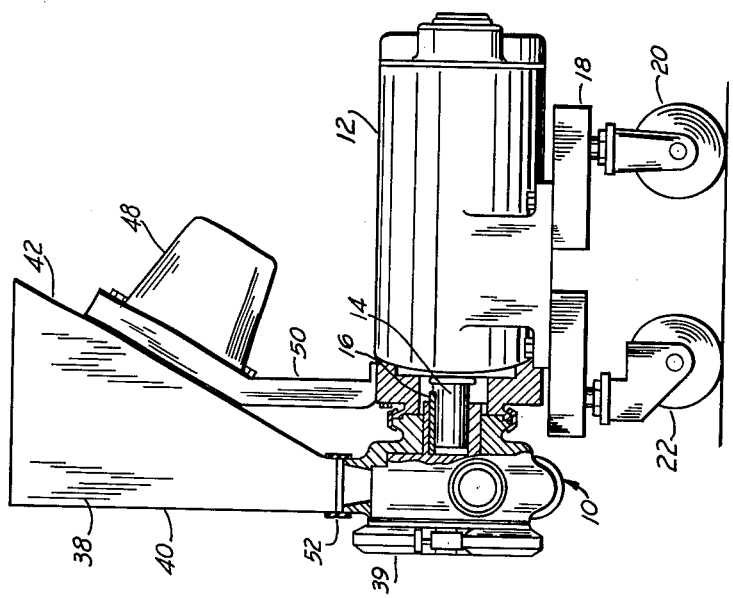
INVENTOR.
GINO MERCURIALI
BY
ATTORNEY

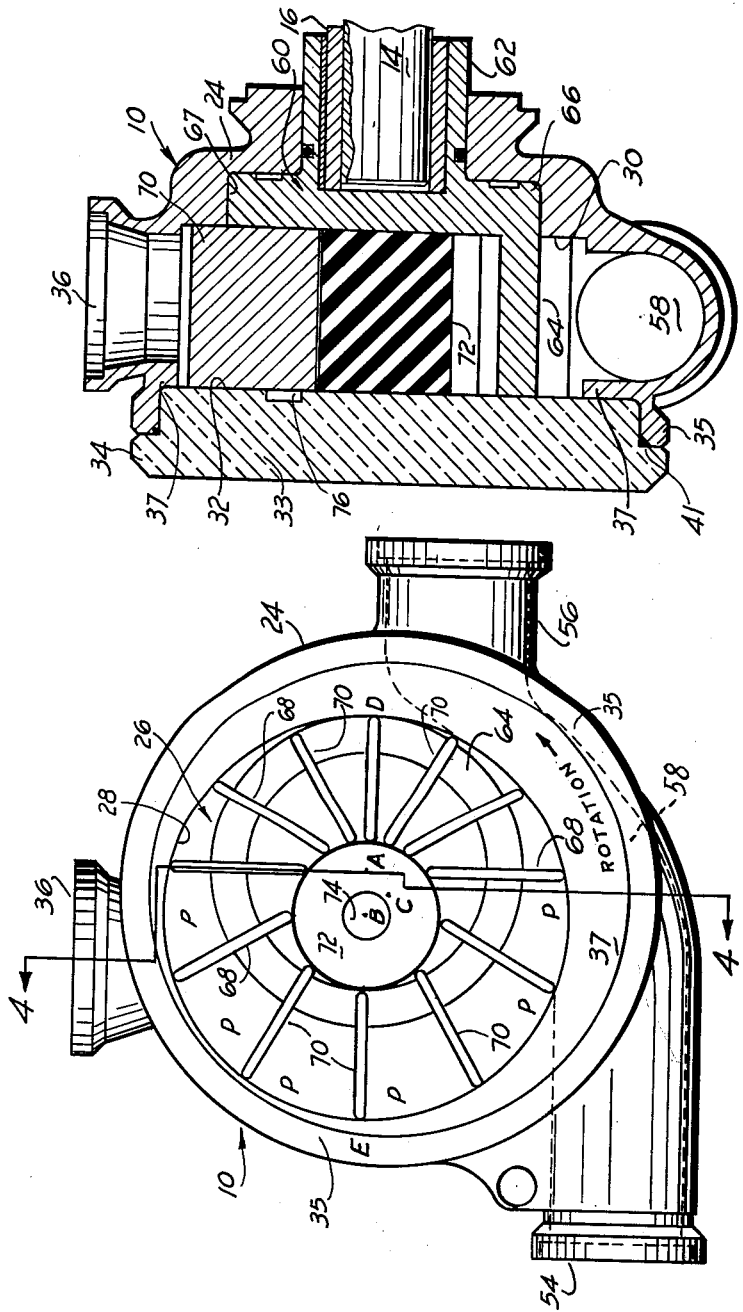

United States Patent Office 3,132,847
Patented May 12, 1964

3,132,847
APPARATUS FOR DISTRIBUTING FRUIT OR NUTS AND THE LIKE INTO A FLOWABLE PRODUCT
Gino Mercuriali, Cedar Rapids, Iowa, assignor to Cherry-Burrell Corporation, Cedar Rapids, Iowa, a corporation of Delaware
Filed Mar. 29, 1962, Ser. No. 183,633
5 Claims. (Cl. 259—9)

This invention relates to an apparatus for placing pieces of fruit or nuts and the like into a flowable product, and more particularly the invention relates to an apparatus commonly called a "fruit-feeder" for ice cream.

In recent years, ice cream has become a very popular product, and many new and different flavors have been introduced on the market. To enhance some of these flavors, the producers have adopted the practice of putting pieces of fresh fruit or nuts into the ice cream. This has led to the demand for some means of continuously feeding the fruit into the ice cream in a uniform and efficient manner. Several such devices, called "fruit-feeders," are known to me and are in commercial use today. However, these prior art fruit-feeders will do only a satisfactory job of adding the desired fruit or nuts uniformly, and moreover, they are relatively complex, difficult to clean, and high in cost. Furthermore, with some fruit-feeders it is difficult to control accurately the quantity of fruit or nuts added to the ice cream. Others at times tend to damage the fruit. Therefore, there is a definite need for an improved fruit-feeding apparatus that will overcome some, if not all, of the shortcomings of the prior art machines.

It is therefore an object of my invention to provide a fruit-feeding apparatus that will produce more uniform distribution of the fruit or nuts throughout the ice cream without damage to the fruit or nut pieces.

It is another object of my invention to provide a fruit-feeding apparatus that is designed to prevent the ice cream flowing through the apparatus backing up into the fruit intake. This is accomplished without any pumping action on the ice cream and without placing a back pressure on the ice cream freezer.

It is a further object of my invention to provide a fruit-feeding apparatus in which the amount of fruit or nuts fed into the ice cream can be accurately measured and controlled. Also, the amount can be easily varied depending on the type of fruit, capacity of the freezer, and density of fruit in the ice cream that is desired.

It is another object of my invention to provide a fruit-feeding apparatus that is extremely simple in design and operation, thereby being less expensive of manufacture and maintain. My novel fruit feeder in also sanitary in design and is easy to disassemble for cleaning.

These and other objects of my invention will be readily apparent from consideration of the following description taken in connection with the accompanying drawings in which:

FIG. 1 is a side elevational view of my novel fruit feeder;

FIG. 2 is an end view of the fruit-feeder;

FIG. 3 is an enlarged end view with the face plate removed; and

FIG. 4 is a sectional view taken on the line 4—4 of FIG. 3 showing the face plate in position but showing the clamping assembly removed.

Referring now to the drawings and particularly to FIGS. 1 and 2, my novel apparatus is comprised of a fruit feeding unit 10 that is powered by a suitable motor 12. A shaft 14 rotatably driven by the motor 12 is connected by suitable means such as key 16 to the driven part of the fruit feeding unit 10. Both the fruit feeding unit 10 and motor 12 are supported on a frame 18 which is preferably mounted on a pair of fixed castors 20 and a pair of movable castors 22 so that the apparatus can be easily moved about.

With reference now particularly to FIGS. 3 and 4, the fruit-feeding unit 10 has a somewhat cylindrical-shaped housing 24 that encloses a cylindrical-shaped chamber 26. Note that the center of chamber 26 does not coincide with the center of the housing 24. Chamber 26 is defined by an annular surface 28 and two parallel sidewalls 30 and 32, the latter being the inside surface of a face plate 33. The face plate 33 has an annular shoulder 34 that abuts the outer edge 35 of the housing 24, and the sidewall 32 abuts a shoulder 37 that is also a part of housing 24. Face plate 33 is secured to housing 24 by suitable clamping means 39 and an O-ring 41 between shoulder 34 and the edge 35 of housing 24 seals the joint.

Communicating with the chamber 26 at the top of housing 24 is a fruit inlet 36 that is fed from a funnel-shaped hopper 38. One end wall 40 of hopper 38 is vertical and the opposite wall 42 slopes inwardly toward it. The hopper 38 is completed by two inwardly sloping walls 44 and 46 that join walls 40 and 42. Secured to wall 42 is a vibrating device 48 of any suitable type or design. Vibrating device 48 is partially supported on a non-rigid mounting bracket 50 secured to the motor 12. Vibrator 48 serves to prevent the fruit from sticking to the walls of the hopper 38 and thereby assures continuous, gravity feed. Since the hopper 38 is constantly vibrating, its connection to inlet 36 cannot be rigid but must be tight to prevent fruit juices from leaking at the joint. A rubber or plastic sealing ring 52 is therefore provided around the joint.

The ice cream to which the fruit or nuts is to be added is passed into the fruit feeding unit 10 through an inlet 54 that is preferably located at the bottom of housing 24. The ice cream containing the fruit is discharged from the unit 10 through an outlet 56 in housing 24. Inlet 54 and outlet 56 are inter-connected by a passageway 58 that opens into the chamber 26 along the bottom thereof. Thus, fruit or nuts fed from hopper 38 into chamber 26 will drop into ice cream flowing in the passageway 58.

However, there must be provided some means for controlling the amount of fruit and distributing it uniformly throughout the ice cream flowing in passageway 58. Furthermore, ice cream must be prevented from being forced up into the fruit inlet 36 and hopper 38. To accomplish these objectives, I have provided a very simple and efficient means. An impeller 60 has a hollow shaft 62 extending from one side that receives the rotatable shaft 14 of motor 12. Shaft 62 is connected to motor shaft 14 by means of the key 16. The impeller 60 is somewhat cup-shaped having an annular portion 64 that is integral with a circular back-plate 66 from which the shaft 62 extends. The diameter of back-plate 66 is less than that of the annular portion 64 and it fits into a recess 67 behind (to the right in FIG. 4) the chamber 26. The width of the annular portion 64 is just slightly less than the distance between the sidewalls 30 and 32 so that when impeller 60 rotates it will contact both sidewalls 30 and 32. Formed in the annular portion 64 of impeller 60 are a plurality of radial slots 68 that extend axially the entire width of the annular portion 64. Slidable in each of slots 68 is an impeller blade 70 whose inner and outer ends are rounded. The blades 70 are the same width as chamber 26 and thus are in contact with sidewalls 30 and 32 and scrape the sidewalls as the impeller 60 rotates. Blades 70 fit tightly within the slots 68 but will freely slide back and forth in the slots 68 along a radial line.

As best seen in FIG. 3, the fixed center of rotation A of the impeller 60 does not coincide with the center B of the chamber 26. Center A is so located with respect to center B that the outside surface of the annular portion 64 will just contact the cylindrical surface 28 at the point D where the horizontal centerline of chamber 26 intersects surface 28. This place of contact between impeller 60 and surface 28 is just above the uppermost point of outlet 56. Thus, outlet 56 and passageway 58 are sealed off from the upper portion of chamber 26 by the impeller 60. As shown in FIG. 3, the center A of impeller 60 is located on the horizontal centerline of chamber 26 and to the right of center B an amount equal to the difference in the diameter of chamber 26 and the outside diameter of impeller 60.

The center C of housing 24 has no critical relationship with either center A or center B, but is located below A and B to provide space for passageway 58.

The impeller blades 70 are all of equal size and thus interchangeable. A cylindrical cam 72, preferably made of rubber or other resilient material, is located inside the annular portion 64 of impeller 60 and engages the inner ends of blades 70. The cam 72 is located so that its outer surface contacts the inner surface of annular portion 64 on the common horizontal center line of centers A and B. Although cam 72 is not connected inside the impeller 60 and thus is free-floating, its location remains substantially fixed with its center coincidental with the center B of chamber 26. The diameter of cam 72 plus twice the length of a blade 70 is equal to the diameter of chamber 26, and thus the cam 72 will continuously exert force on all the blades 70 and maintain their outer ends in engagement with the cylindrical surface 28 as the impeller 60 rotates. For the purpose of additional resiliency, cam 72 can be provided with an opening 74 in its center.

From FIG. 3, it can be seen that spaces or pockets P are formed between successive blades 70, the annular portion 64, and the surface 28 of chamber 26. The size of each of these pockets constantly changes as the impeller 60 rotates. From point D, where the impeller 60 contacts the cylindrical surface 28 of chamber 26, pockets P gradually increase in volume from zero to a maximum size at point E diametrically opposite point D. The pockets P then gradually decrease in size until they reach point D again. Thus, while the pockets are being filled they are increasing in size, and during the entire time that they are in communication with the passageway 58 they are decreasing in size. It is obvious that inlet 54 could be located with its uppermost point at any place below point E since the pockets start decreasing in size at that point. However, I prefer to locate inlet 54 as shown to minimize the possibility of ice cream backing up into the fruit inlet 36.

Similarly, pockets are formed inside the annular portion 64 between successive blades 70, the inside surface of annular portion 64, and the outside surface of the cam member 72. These pockets are also bounded on their sides by the sidewalls 30 and 32. As the impeller 60 rotates one revolution, these inside pockets also increase in size from zero to a maximum size and then decrease to zero again. They reach their maximum size when the size of pockets P are zero and vice versa.

In operation, the desired fruit or nut pieces are placed in the hopper 38 and will drop by force of gravity through inlet 36 filling the pockets P as they pass under the inlet 36. When under the inlet 36, the pockets P are increasing in size but have not reached maximum size, thus assuring that the fruit pieces do not become crushed. The fruit pieces will then be carried downwardly in pockets P as the impeller 60 rotates counter-clockwise. At the point where pockets P reach the passageway 58 through which the ice cream is flowing, they are still at least as big as they were when they were filled with the fruit pieces, thus further assuring that the fruit does not become crushed. Since the size of the pockets P starts to decrease at this point, and since the leading blade 70 of each pocket is approaching a more vertical position, the fruit in each pocket will by force of gravity and by the gentle squeezing action of the decreasing pockets be forced into the flow of ice cream in passageway 58. At point D the pockets P have decreased in size to zero and are completely closed off from the passageway 58. Thus, all the fruit is squeezed out into the ice cream and the mixture leaving outlet 56 is prevented from backing up into the upper portion of chamber 26 by the seal formed between annular portion 64 and surface 28.

Since it is difficult to provide a perfect seal between the metal-to-metal contact of blades 70 and the slots 68, ice cream or juice from the fruit may leak into the pockets inside of annular portion 64. If this happens, pressure will build up in the inside pockets as they decrease in size. In order to relieve this pressure and also to force any liquid back into the flow of ice cream in passageway 58, I provide a slot 76 milled into the sidewall 32 of face-plate 33. Slot 76 provides a small passageway that connects the inside pockets and the outside pockets P. The general shape and location of slot 76 is not too critical, but I prefer to locate it and make it "cane-shaped" as shown in FIG. 2 so that it connects the inside pockets that are decreasing in size with pockets P that are increasing in size. Therefore, the pressure will always be greater in these particular inside pockets than in the corresponding pockets P, and the flow through the passageway formed by slot 76 will be from the inside pockets to pockets P.

My novel fruit-feeder is easily controlled over a wide range by merely providing means (not shown) to vary the speed of the motor 12, which in turn varies the speed of the impeller 60. If desired the face-plate 33 may be made of a transparent plastic material, which permits visual checking of the fruit feeding operation and aids the operator in controlling the speed of the impeller 60. In this way, the amount of fruit fed into the ice cream can be controlled very accurately. The fruit feeder has no pumping action, and therefore exerts no back pressure on the inlet 54 which is usually connected directly to the ice cream freezer.

The fruit-feeding unit 10 is very easy to disassemble and clean. By removing the clamping assembly 39 and the faceplate 33, the blades 70 and cam member 72 can be easily slipped out from the impeller 60. This can be done without tools and in a matter of minutes. Reassembling is equally quick and easy. All surfaces on the blades 70, cam 72 and the interior of housing 24 are smooth and easy to clean. Thus, the design of my fruit-feeder can meet the highest sanitary standards. My novel device has a minimum number of parts, and a minimum number of moving parts. It is extremely simple, with parts that are easy to manufacture and therefore is considerably less expensive than the presently known devices of a similar nature.

Although I have shown my novel device in the form of a preferred embodiment, it will be obvious to those skilled in the art that various revisions and modifications can be made without departing from the spirit of the invention. For example, suitable controls could be utilized with my novel apparatus to coordinate the stopping and starting of the motor automatically with the flow of ice cream from the freezer so that fruit would not be fed into the passageway 58 unless ice cream is flowing through it. Moreover, means could be provided automatically to keep the hopper 38 full if this is desired. It is therefore my intention that all revisions and modifications that are obvious to those skilled in the art will be included within the scope of my invention, which is to be determined by the following claims.

I claim:

1. An apparatus of the class described comprising a housing having a cylindrical chamber therein, an annular impeller rotatable in said chamber about an axis eccentrically located with respect to the axis of said chamber, said impeller having a plurality of radial slots therein, a plurality of blades rotatable with said impeller, said blades being received and slidable in said slots along radial lines as said impeller rotates, a resilient cylindrical-shaped cam member free-floating inside of said impeller and engaging said impeller blades to exert a radial force on said blades and thereby cause them to engage the cylindrical surface of said chamber at all times, said cylindrical cam member being rotatable with said blades and impeller about an axis eccentrically located with respect to the axis of said impeller, a first inlet in said housing communicating with said chamber, a second inlet in said housing communicating with said chamber remote from said first inlet, and an outlet in said housing communicating with said chamber and said first and second inlets.

2. An apparatus for feeding pieces of fruit or nuts and the like into ice cream and the like, said apparatus comprising a housing having a cylindrical chamber therein, an annular impeller having a plurality of radial slots therein rotatable in said chamber about an axis eccentrically located with respect to the center of said chamber, said rotative axis of said impeller being so located with respect to the center of said chamber that the outer surface of said impeller engages the cylindrical surface of said chamber at one place only, a plurality of substantially equal size impeller blades received and slidable along radial lines in said slots, a cylindrical resilient cam member received inside said impeller and rotatable about a central axis eccentrically located with respect to the axis of said impeller, the central axis of said cam member and the center of said chamber being substantially coincidental, said impeller blades extending inside said impeller and engaging said cam member whereby said blades are maintained in constant engagement with the surfaces of said chamber to form exterior pockets between the impeller, the surfaces of said chamber, and the surfaces of successive blades, said pockets varying in size as said impeller rotates, a fruit inlet in said housing communicating with the upper portion of said chamber, an ice cream inlet at one side of said housing and communicating with said chamber, and an outlet at the other side of said housing communicating with said chamber for discharging the ice cream-fruit mixture, the place of engagement of said impeller with the cylindrical surface of said chamber being located between the outlet and the fruit inlet.

3. The apparatus of claim 2 in which the ice cream inlet is located on the lower portion of one side of said housing, the outlet is located on the lower portion of the opposite side of said housing, and said ice cream inlet and said outlet are connected by a passageway in said housing along the bottom of and extending beyond the cylindrical chamber.

4. The apparatus of claim 3 in which the fruit inlet in said housing is located on the upper portion of the housing at a place where said pockets are increasing in size as the impeller rotates, said pockets decreasing in size along the entire length of said passageway thereby to force the pieces of fruit into the ice cream flowing through said passageway.

5. The apparatus of claim 2 in which interior pockets are formed inside the impeller between successive impeller blades, said interior pockets also varying in size as said impeller rotates, and a slot in said housing connects the interior pockets that are decreasing in size with exterior pockets that are increasing in size.

References Cited in the file of this patent

UNITED STATES PATENTS

| | | |
|---|---|---|
| 1,505,982 | Traudt | Aug. 26, 1924 |
| 1,804,604 | Gilbert | May 12, 1931 |
| 1,833,275 | Burmeister | Nov. 24, 1931 |
| 2,239,165 | Adams | Apr. 22, 1941 |
| 2,280,271 | Sullivan | Apr. 21, 1942 |